Figure 1:
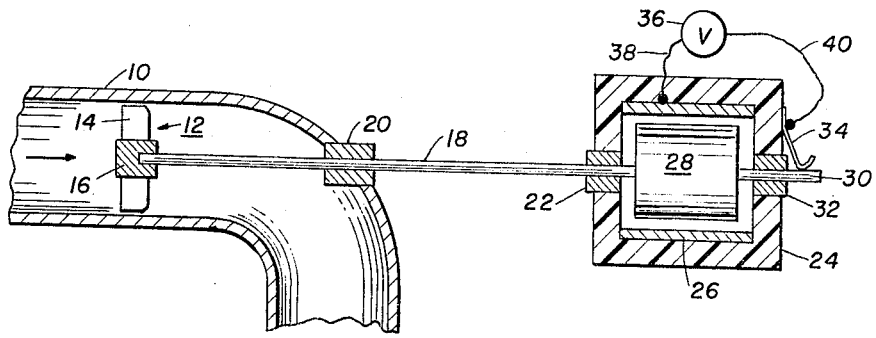

Oct. 18, 1966     D. L. KLASS ETAL     3,279,496
APPARATUS FOR DETERMINING AND CONTROLLING FLOW RATES
Filed March 11, 1964     2 Sheets-Sheet 1

INVENTORS.
DONALD L. KLASS
THOMAS W. MARTINEK
BY ROBERT M. HAINES
ROBERT B. McEUEN

*Edward H. Fang*
ATTORNEY.

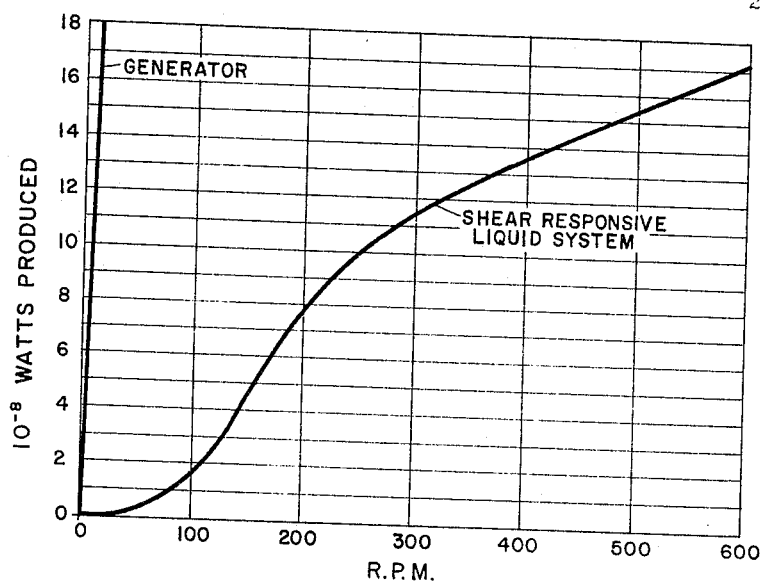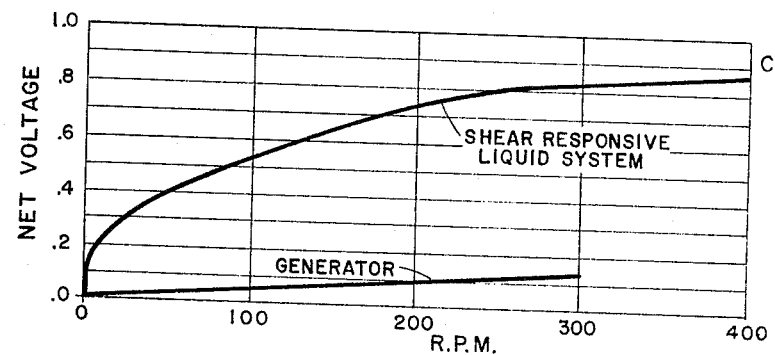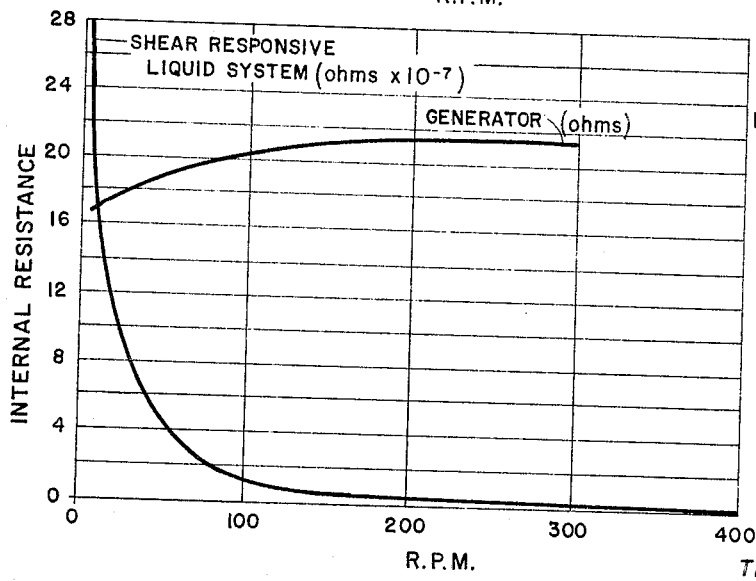

United States Patent Office 3,279,496
Patented Oct. 18, 1966

3,279,496
APPARATUS FOR DETERMINING AND CONTROLLING FLOW RATES
Donald L. Klass, Barrington, Thomas W. Martinek and Robert M. Haines, Crystal Lake, and Robert B. McEuen, Barrington, Ill., assignors, by mesne assignments, to Union Oil Company of California, Los Angeles, Calif., a corporation of California
Filed Mar. 11, 1964, Ser. No. 351,044
9 Claims. (Cl. 137—487.5)

This invention relates to the measurement and control of the rate of flow of a fluid through a conduit and, more particularly, to the utilization of a suspension of poorly-conducting particles in an oleaginous vehicle for controlling and measuring the rate of flow of a fluid through a conduit.

A number of electrical phenomena are exhibited when dispersions of certain solids in oils are subjected to shear stresses. When poorly-conducting particles in an oleaginous vehicle of relatively low dielectric constant, such as a dispersion of silica in a mineral oil, is subjected to shear stress, as between opposing surfaces of two bodies moving with respect to each other, the dispersion exhibits changes in electrical properties, such as a decrease in D.C. resistance, a change in dielectric constant, and/or the generation of an induced potential. The magnitude of each of these phenomena depends upon the dispersion composition, the shear rate, the temperature, and the spacing between the opposing surfaces. The magnitude of the induced potential depends also on the compositions of the opposing surfaces. For the purpose of this application, such suspensions are hereinafter designated "shear-responsive" or "electrodynamic" liquids or fluids, and the associated phenomena are hereinafter designated as the "electrokinetic" or "electrodynamic" properties of the liquids or fluids.

In many instances, it is desirable to measure and/or automatically control the rate at which a fluid, e.g., a liquid obtained from a source of varying head, flows through a conduit. This invention is based on an apparatus and method utilizing changes in electrokinetic properties of a shear-responsive fluid for measuring and/or controlling the flow rate of a fluid through a conduit.

In accordance with this invention, a rotor is disposed in a fluid conduit for converting a part of the kinetic energy of linear or axial flow of a fluid through the conduit into rotational kinetic energy. The rotor is mechanically connected to a shear-responsive liquid containing system for shearing the shear-responsive liquid at a rate proportional to the rotational speed of the rotor. Inasmuch as the rotational speed of the rotor is dependent upon the linear flow rate of the fluid, the shear-responsive fluid will be sheared at a rate proportional to the flow rate of the fluid. Such a system is usually, but not necessarily, located externally of the fluid conduit. With all other variables, e.g., temperature of the shear-responsive fluid, remaining constant, changes in the electrokinetic or electrodynamic properties of the shear-responsive fluids will be dependent upon the flow rate of the fluid through the conduit. The change in an electrokinetic property of the shear-responsive fluid is used, with suitable electrical circuitry, to control the rate of fluid flow through the conduit by actuating a valve in the conduit and/or to measure the flow rate.

It is therefore an object of this invention to provide an apparatus and method for measuring and/or controlling the fluid flow.

Another object of this invention is to provide an apparatus and method utilizing a shear-responsive fluid for measuring and/or controlling the rate of fluid flow through a conduit.

Figure 5:
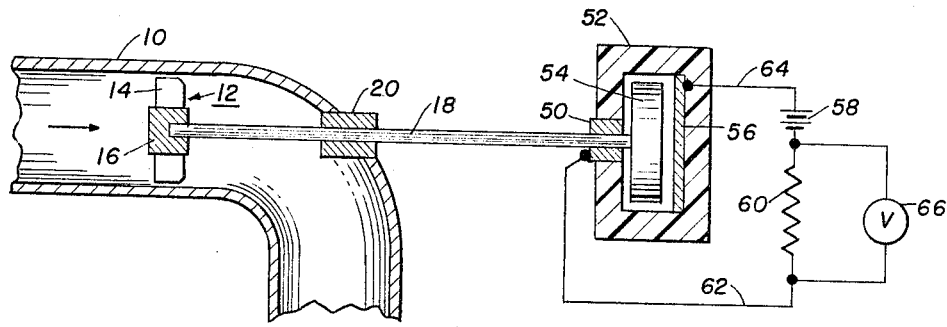
Figure 6:
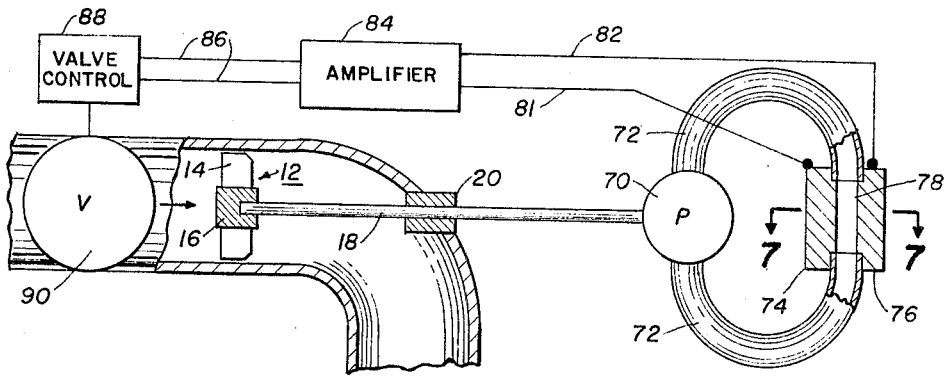
Figure 7:
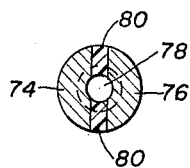

Still another object of this invention is to provide an apparatus and method for measuring and/or controlling the rate of fluid flow through a conduit wherein a shear-responsive liquid is sheared at a rate proportional to the fluid flow rate and the change in an electrokinetic property of the shear-responsive fluid is used to measure and/or control the fluid flow rate:

FIGURE 1 is an elevational view, partly schematic and partly in section, of an apparatus of this invention for measuring the flow rate of a fluid through a conduit, FIGURES 2–4 are graphical comparisons of a conventional electric generator and a system in which a shear-responsive fluid is under shear, FIGURE 5 is an elevational view, partly schematic and partly in section, of an alternative measuring apparatus of this invention, FIGURE 6 is an elevational view, partly schematic and partly in section, of an apparatus of this invention for controlling the rate of fluid flow through a conduit, and FIGURE 7 is a sectional view in the plane 7—7 of FIGURE 6.

Referring to FIGURE 1, the numeral 10 designates a conduit through which a fluid is flowing in the direction indicated by the arrow. Disposed in conduit 10 is rotor 12 having blades 14 positioned at equally spaced intervals about hub 16. Rotor 12, which is mounted on rotatable shaft 18, is so designed that it is rotated by the axial flow of a fluid through conduit 10. Shaft 18 extends axially of rotor 12 and passes through bearing 20 in the wall of conduit 10 in fluid-tight relationship therewith.

The end of shaft 18 extending out of conduit 10 passes in fluid-tight relationship through bearing 22 in an end wall of nonrotatable drum 24. As illustrated, drum 24 is fabricated of a high resistivity material such as Bakelite, but is provided with electrically conductive lining 26. Axially supported on the end of shaft 18 within drum 24 so that it is rotatable with rotor 12, is electrically conductive cylinder 28. The outer surface of cylinder 28 is spaced inwardly from and concentric with lining 26 so that the opposing conducting surfaces thereof are maintained substantially uniformly spaced from each other when cylinder 28 is rotated with respect to lining 26. A shear-responsive fluid is confined in the space between lining 26 and cylinder 28.

Rotatable cylinder 28 is provided with electrically conductive trunnion 30, which extends axially of cylinder 28 and passes through bearing 32 in fluid-tight relationship therewith. Trunnion 30 is continuously contacted by brush 34 as rotor 12 causes cylinder 28 to be rotated with respect to drum 24. In this embodiment, the means for indicating the rate of flow of a fluid through conduit 10 comprises voltmeter 36, which is connected by lead wires 38 and 40 to lining 26 and brush 34, respectively. Voltmeter 36 is capable of reading fractional voltages. If desired, voltmeter 36 may be precalibrated for use with a specific system to read directly in terms of rate of fluid flow.

Inasmuch as the changes in electrokinetic properties of a shear responsive liquid vary as the temperature of the shear responsive fluid varies, it is preferred that the indicating circuit include temperature compensating means when the shear responsive fluid is subject to changes in environmental temperature. The simplest form of temperature compensation consists of a resistor (or plurality of resistors) connected in parallel or series with voltmeter 36. The resistor should be selected so that it has a positive temperature coefficient of resistance of the same magnitude as the negative coefficient of the shear responsive liquid used, or conversely, depending on the particular shear-responsive liquid used.

In operation, the axial flow of a fluid in conduit 10 will impart radial motion to cylinder 28 through rotor 12 and shaft 18. Inasmuch as drum 24 is nonrotatable the rotation of cylinder 28 will shear the confined shear-responsive fluid at a rate proportional to the flow rate of the fluid through conduit 10. With all other variables, e.g., temperature of the shear-responsive fluid and spacing between lining 26 and cylinder 28, remaining constant, the change in the electrokinetic properties of the shear-responsive fluid will be directly proportional to the rate of fluid flow. The flow rate can thusly be observed by watching voltmeter 36, which may be calibrated in terms of flow rate.

The utilization of a change in electrokinetic property of a shear-responsive fluid to measure and/or control the flow rate of a fluid through a conduit in accordance with this invention has definite advantages over similarly using a conventionally generator. These advantages will be readily apparent by reference to FIGURES 2–4, which graphically compare a cenventional generator and a shear responsive liquid-containing system, both of which were of similar physical size. The generator utilized in the comparison was a 6-volt D.C. generator (Moto-Mite, type MMF–06, sold by Globe Industries Inc. of Dayton, Ohio). The shear-responsive-fluid-containing system was comprised of two concentric cylinders with the outer cylinder being fabricated of brass and rotatable with respect to the other cylinder which was fabricated of aluminum. The diameter of the outer cylinder was 1.45 inch and the concentric cylinders were spaced 0.010 inch apart. The shear-responsive fluid, which was maintained at about 25° C. when the data depicted in the graphs was obtained, was of the following composition:

| | Wt. percent |
|---|---|
| Silica (dry) | 47.20 |
| Water (on silica) | 3.39 |
| Glycerol monooleate [1] | 5.56 |
| Kremol 40 oil [2] | 29.69 |
| Amine 220 [3] | 10.12 |
| Ethylene Glycol | 4.04 |

[1] C.P. Hall and Co. CPH/128
[2] Sherwood Refining Co., 43 SUS at 100° F., 0.816 g./cc.
[3] Union Carbide Chem. Divis. 90% 1-hydroxyethyl-2-heptadecylimidazoline Reference is first made to FIGURE 2 which graphically compares the power output changes of the generator and the shear responsive system as the rotational speeds of the armature of the generator and the rotatable member of the shear responsive fluid system are varied. Both systems were subject to the same resistive load. It can be seen in FIGURE 2 that there is a vast difference in in the power produced by the generator and the shear-responsive fluid system, as for example, the generator produces about $1 \times 10^3$ more power than the shear-responsive system in the range of about 200 r.p.m. or less. It thus becomes obvious that the shear responsive fluid system is not primarily useful as a source of power generation. The advantage of using a shear-responsive fluid system rather than a conventional generator will become apparent with reference to FIGURE 3, which compares the voltages produced by a generator and a shear responsive fluid system while each of the systems was subjected to the same resistance load of $10^9$ ohms. It will be noted that the voltage change in the 0 to about 250 revolutions per minute range of the shear responsive fluid system is substantially more pronounced than voltage change in the generator output voltage. Therefore, the shear responsive fluid system can be used to obtain more accurate measurement and/or control of flow rate than if a conventional generator were used. FIGURE 4, which shows the change in internal resistance of the generator and the shear-responsive fluid system as a function of the rotational members, was obtained from data in FIGURES 2 and 3. This figure, as does FIGURE 3, demonstrates that the shear responsive fluid system is more accurate at relatively low revolutions per minute than a conventional generator for measuring and/or controlling fluid flow.

Referring to FIGURE 5, which illustrates another alternative embodiment of an apparatus of this invention for measuring flow rate, rotor 12 is disposed in fluid conduit 10. Rotor 12, which is mounted on one end of rotatable shaft 18, comprises blades 14 positioned about hub 16 so that a part of the kinetic energy of the linear flow of a fluid through conduit 10 causes the rotation of shaft 18, the rotational speed of shaft 18 being directly dependent on the flow rate through conduit 10. Shaft 18 extends out of conduit 10 through bearing 20 in fluid-tight relationship therewith.

The other end of shaft 18 passes through electricially conductive bearing 50 into nonrotatable hollow cylinder 52, which is fabricated of a high resistivity material. Axially supported on shaft 18 within cylinder 52 so that it is rotatable with rotor 12 is electrically conductive disk 54. Also disposed in hollow cylinder 52 is electrically conductive plate 56, spaced from disk 54, and a shear responsive fluid between disk 54 and plate 56. Plate 56 is secured to cylinder 52 so that it is nonrotatable and substantially uniformly spaced from rotatable disk 54. Therefore, the rotation of rotatable disk 54 with respect to plate 56 will apply shear stress to the confined shear responsive liquid at a rate which is proportional to the flow rate of a fluid through conduit 10.

The electrical measuring circuit illustrated in FIGURE 5 comprises D.C. potential 58 and resistor 60 series connected between bearing 50 and plate 56 by lead wires 62 and 64, respectively. It will be apparent that at least the portion of shaft 18 extending from bearing 50 to disk 54 must be electrically conductive to maintain electrical contact between disk 54 and lead wire 62. Voltmeter 66 is parallel connected with resistor 60 to indicate the IR drop across resistor 60. As a specific example of the indicating circuit, potential source 58 is a 45 volt potential source and resistor 60 is a $1 \times 10^8$ ohm resistor, while voltmeter 66 is capable of reading fractional voltages.

The operation of this apparatus is similar to the operation of the apparatus depicted in FIGURE 1. Assuming a fluid is flowing through conduit 10 in the direction indicated by the arrow, a part of the kinetic energy of the flowing fluid is converted into rotational kinetic energy to rotate impellor 12. This rotational motion is transmitted through shaft 18 to rotate disk 54 with respect to plate 56, thereby shearing the confined shear responsive fluid. Since the relative movement of disk 54 with respect to plate 56 is proportional to the flow rate of a fluid through conduit 10 and the change in resistance of a shear responsive fluid is a function of the shear rate, the change in IR drop across resistor 60, which is indicated by voltmeter 66, is a function of the flow rate.

Referring to FIGURES 6 and 7, wherein a control embodiment of the apparatus of this invention is illustrated, impellor 12 is disposed in conduit 10 so that a fluid flowing through conduit 10 and contacting blades 14 imparts rotary motion to hub 16 and rotatable shaft 18 extending axially from hub 16. The end of shaft 18 extending out of conduit 10 through bearing 20 is operatively connected to pump 70 to operate the same at a rate proportional to the rotational speed of rotor 12, thereby causing the flow rate through conduit 72, which is fabricated of a high electrically resistive material, to be proportional to the rotational speed of rotor 12. Disposed between two sections of conduit 72 are spaced conductive members 74 and 76 defining longitudinal passageway 78 which communicates with the opening in conduit 72. Conductive members 74 and 76 are maintained spaced from each other by insulating spacers 80.

Conductive members 74 and 76 are electrically connected by lead wires 81 and 82, respectively, to amplifier 84 wherein the potential generated by the shear responsive fluid under shear is amplified. The output leads of amplifier 84 are connected by lead wires 86 to valve control mechanism 88, which opens and closes valve 90 in conduit 10 as the potential generated by the shear responsive fluid varies.

It will be evident that in this embodiment the shear responsive fluid is sheared at a rate proportional to the flow rate of a fluid flowing through conduit 10 by being circulated between two stationary members rather than by being confined between two members which are moved with respect to each other. The type of control of valve 90 will depend on the desired characteristics of the fluid flow through conduit 10. For example, in instances where it is desired that the flow rate through conduit 10 be substantially uniform, valve control 88 is such that valve 90 is opened further as the generated potential decreases.

Although this invention has been described in relation to specific embodiments, it will be apparent that obvious modification may be made by one skilled in the art without departing from the intended scope of this invention. For example, although the nonrotatable members of the shear responsive liquid containing systems are illustrated as being fabricated of high resistivity materials having electrically conductive inserts or plates spaced from the rotatable members, it will be evident that the rotatable members may be fabricated entirely of electrically conductive materials provided that suitable electrical insulation is maintained between the rotatable and nonrotatable members. The opposing electrically conductive surfaces of the rotatable and nonrotatable members may be fabricated of the same metal or different metals. However, it is preferred that the opposing surfaces be fabricated of dissimilar metals when the change in induced potential is utilized for controlling and/or measuring the flow rate, since a greater D.C. potential is generated by using different metals than when the same metal is used for both surfaces. Another obvious modification would be to accomplish the electrical connection between the rotatable member and the associated electrical circuitry by means other than that illustrated. The space between the opposing members where the shear responsive fluid is sheared will generally be about .002 to .050 inch, although other spacings may be used. Various other changes in the systems for shearing the shear responsive fluids will be evident. Although it is preferred for simplicity of design and construction in instances where the shear responsive fluid is sheared between two members moving with respect to each other that the two members be rotatable with respect to each other, it will be evident that other relative movement such as reciprocal movement of the two members can be employed. The specific embodiments of the systems for shearing the shear responsive liquid depicted in FIGURES 1, 5 and 6 and 7 are all interchangeable. For example, the shear responsive fluid containing system illustrated in FIGURE 1 may be utilized in combination with the electrical circuitry illustrated in the embodiments of FIGURE 5 and FIGURES 6 and 7. Similarly, the shearing system of FIGURES 6 and 7 may be used in combination with the electrical circuitry illustrated in the embodiments of FIGURES 1 and 5.

If desired, any one embodiment may include means for for both measuring and controlling the rate of fluid flow through the conduit. To illustrate, a voltmeter capable of reading fractional voltages may be connected between lead wires 81 and 82 of FIGURE 6 so that the flow rate is both measured and controlled.

The shear responsive or electrodynamic liquids utilized in the apparatus and method of this invention form no part of the invention and, for the purpose of this specification and claims, the term "fluid" is intended to include both liquids in the ordinary sense of the term, i.e., readily flowing fluids, and materials of relatively high viscosity, i.e., those having a grease-like consistency. In general, the shear responsive fluids of this invention will consist of at least about 1% by volume and preferably 5 to 48% by volume of particulate poorly conducting materials dispersed in a nonpolar oleaginous vehicle which has a dielectric constant less than about 5. The poorly conducting particles should be of an average size in the range of about 0.001 to 5.0 microns diameter. The dispersed particulate material may be of piezoelectric or nonpiezoelectric materials. Finely divided silica is especially suitable for use in shear responsive fluids. Examples of other poorly conducting particles which may be used include aluminum octoate, aluminum oleate, aluminum stearate, barium titanate, calcium stearate, activated charcoal, crystalline D-sorbitol, lead oxide, lithium stearate, magnesium silicate, micronized mica, white bentonite, zinc stearate, vanadium pentoxide, basic aluminum acetate, etc.

The oleaginous vehicle in which the non-conducting particles are dispersed is preferably a refined mineral oil fraction having a viscosity of about 500° F. However, a wide variety of non-polar oleaginous materials can be employed. Examples of suitable materials include white oils, lubricating oil stocks such as neutral oils, transformer oils, synthetic oils resulting from polymerization of unsaturated hydrocarbons, alpha methyl benzyl ether, benzene, bromocyclohexane, chlorinated paraffin, dibenzyl ether, dichloroethyl ether, chlorinated or fluorinated hydrocarbons in the lubricating-oil viscosity range, n-butyl ether, silicate ester, toluene, etc.

Where the nonconducting particles in high concentrations are incorporated in the shear responsive fluid, it is usually necessary to add a material to fluidize the mixture and to keep the viscosity of the shear responsive fluid at a reasonable level. For this purpose, varying amounts of a neutral surfactant can be incorporated to maintain the mixture of silica and vehicle as a fluid. Suitable neutral surfactants which may be used are selected from the polyoxyalkylene ethers, hydroxyethers, polyhydroxyethers and esters, as well as neutral sulfonates and other neutral surfactants. Other neutral polar organic materials such as $C_6$–$C_{30}$ mono- or polyhydric alcohols are suitable fluidizers. Suitable neutral fluidizers include glycerol monooleate, sorbitan sesquioleate, glycol monooleate, alkyl aryl polyether alcohols, sodium dialkylsulfosuccinate, hexyl ether alcohol, butyl Cellosolve, octyl alcohol and dodecyl alcohol. The neutral fluidizer may be added in quantities sufficient to fluidize the mixture of vehicle and particles but usually no more than is necessary to obtain sufficient fluidity is used. The amount added will seldom exceed about 25% by volume.

A variety of polar materials, including water, may be used to alter the properties of the shear-responsive fluid. Lower hydroxy-substituted hydrocarbons have been found to be highly efficient. Especially preferred are the aliphatic polyhydroxy-substituted hydrocarbons such as ethylene glycol. In general, such material will be added to the shear-responsive fluid at concentrations within the range of 0 to about 10% by volume.

The following shear-responsive fluid composition is set forth only as an example of one suitable fluid which may be used.

| | Weight percent |
|---|---|
| Silica | 48.48 |
| Water (absorbed on the silica) | 6.18 |
| Glycerol monooleate | 17.75 |
| 80 vis neutral oil | 27.59 |

The embodiments of this invention in which an exclusive property or privilege is claimed are defined as follows:

1. A fluid flow-responsive apparatus comprising a conduit for confining a fluid under flow, rotor means disposed in said conduit for rotation by the axial flow of a fluid through said conduit, means actuated by rotation of said rotor means for shearing a shear responsive fluid at a rate proportional to the rotational speed of said rotor means between two substantially uniformly spaced members having opposing electrically conductive surfaces, said electrically conductive surfaces being connected in an electric circuit including means responsive to a change in an electrokinetic property of said shear-responsive fluid.

2. An apparatus in accordance with claim 1 in which said members are mounted for relative movement in response to the rotation of said rotor means.

3. An apparatus in accordance with claim 2 in which one of said members is rotatably supported, said rotatably supported member being mechanically connected to said rotor means.

4. An apparatus in accordance with claim 1 including pump means mechanically connected to said rotor means to circulate said shear responsive fluid between said electrically conductive surfaces at a rate proportional to the rotational speed of said rotor means.

5. An apparatus in accordance with claim 1 in which said circuit includes means responsive to a change in resistivity of said shear responsive liquid upon the shearing thereof.

6. An apparatus in accordance with claim 5 in which said means responsive to the change in resistivity of said shear responsive fluid is a meter.

7. An apparatus in accordance with claim 1 in which said circuit includes means responsive to the potential generated by said shear responsive fluid upon being sheared.

8. An apparatus in accordance with claim 7 including a fluid flow regulating valve disposed in said conduit and said means responsive to the potential generated is adapted to actuate said valve.

9. An apparatus in accordance with claim 7 in which said means responsive to the potential generated is a meter.

References Cited by the Examiner

UNITED STATES PATENTS

| | | | |
|---|---|---|---|
| 2,615,940 | 10/1952 | Williams | 73—194 X |
| 2,644,901 | 7/1953 | Hardway | 73—516 X |
| 3,196,963 | 7/1965 | Klass et al. | 310—5 X |
| 3,216,252 | 11/1965 | Chapman et al. | 73—229 |

RICHARD C. QUEISSER, *Primary Examiner.*

EDWARD D. GILHOOLY, *Assistant Examiner.*